UNITED STATES PATENT OFFICE.

BERTHOLD SINGER, OF CHICAGO, ILLINOIS.

COMPOSITION FOR LAYING AND ABSORBING DUST.

No. 827,887.   Specification of Letters Patent.   Patented Aug. 7, 1906.

Application filed January 25, 1906. Serial No. 297,861.

*To all whom it may concern:*

Be it known that I, BERTHOLD SINGER, a citizen of the United States, residing at Chicago, county of Cook, and State of Illinois, have invented a certain new and useful Composition of Matter for Laying and Absorbing Dust, of which the following is a full, clear, and exact specification.

My invention relates to a substance or composition adapted to be placed upon the floors of rooms and other places for laying and collecting or absorbing the dust thereon preparatory to and during sweeping.

Heretofore it has been proposed to employ oily substances as an agent for absorbing or collecting the dust and to combine therewith an oil absorbent whose function is that of a vehicle for carrying the oil and preventing free oil from leaving the compound and staining or damaging the floor or other surface on which it is used; but these compositions require such a fine adjustment of the proportions of the oil and the oil absorbent and other ingredients used in the compound to bring about a complete absorption of all of the free oil and at the same time to have the oil absorbent sufficiently saturated with the oil as to enable it to pick up or absorb the dust as to make the process difficult and expensive to practice on a commercial basis. Moreover, the oil of such compositions even when properly proportioned at the start evaporates in warm climates in course of time, thereby detracting from the dust absorbing or laying properties of the material.

The primary object of this invention, therefore, is to provide an improved and efficient composition of matter for laying and absorbing dust, which shall be free from oil or oily or fatty substances or similar ingredients liable to damage or stain the surfaces upon which it is used and which at the same time shall be of the moist character essential for collecting or laying dust.

With a view to the accomplishment of these ends and the attainment of certain other objects which will hereinafter appear the invention consists in the composition of matter hereinafter described, and particularly pointed out in the claims.

In carrying out my invention I employ in combination with some suitable absorbent an ingredient of a highly hygroscopic nature which has the property of drawing moisture from the atmosphere and of imparting the same to the absorbent with which it is combined, thereby keeping the mass in a moist condition in all climates and at all times; the function of the hygroscopic ingredient being to draw and collect the moisture, while that of the absorbent is to take the moisture from the hygroscopic ingredient and by becoming saturated is enabled to collect or absorb the particles of dust with which it comes into contact, the hygroscopic material drawing the moisture from the atmosphere automatically, as it were, and imparting the same to the absorbent material as fast as it might evaporate from the latter or be absorbed therefrom by the added dust particles.

For the hygroscopic material or ingredient I employ calcium chlorid or chlorid of magnesia, but preferably calcium chlorid, and for the absorbent I employ any suitable porous material—such as sawdust, sand, silica, or salt, and in fact any porous vegetable or mineral substance which will receive and absorb the moisture from the hygroscopic ingredient and will not dirty or damage the floor or other surface on which it is used.

The hygroscopic ingredient is granulated, comminuted, or pulverized, and to ten pounds thereof I add about one hundred pounds of the absorbent, sawdust, sand, or silica, &c., and these are thoroughly commingled and are then ready for use, the same being employed as a granular or comminuted mass, which is sprinkled upon the floor or laid thereon in rows and swept transversely of the row in the ordinary manner. Where the absorbent employed is of a light character or of a low specific gravity, such as sawdust, the composition may be improved by the addition of a heavier ingredient—such as sand, silica, or salt, and by "salt" as used herein is meant chlorid of sodium or any of the soluble salts—the function of such additional heavier ingredient being to prevent the absorbent from flying too freely before the broom and also serving as a cutting or cleansing agent; but it is to be understood, nevertheless, that these heavier substances, such as sand and silica, may be used alone in conjunction with the hygroscopic ingredient without the sawdust, as sand and silica, either singly or combined, act as an absorbent for the moisture gathered by the hygroscopic ingredient, inasmuch as the particles thereof collect the moisture from the hygroscopic ingredient upon their impervious surfaces and in the interstices or spaces between them and are thus enabled to collect or absorb the dust particles with which they come into contact.

What I claim, and desire to secure by Letters Patent, is—

1. The herein-described composition of matter for laying or absorbing dust, containing chlorid of calcium, and a moisture absorbent less hygroscopic than chlorid of calcium, all in a comminuted mass; the said moisture absorbent being composed of particles separate from and foreign to the said chlorid of calcium.

2. The herein-described composition of matter for laying or absorbing dust, containing a hygroscopic substance and sawdust both in a state of free granules.

3. The herein-described composition of matter for laying or absorbing dust, containing chlorid of calcium and sawdust intimately mixed in a granular state.

4. The herein-described composition of matter for laying or absorbing dust, containing a hygroscopic substance, a moisture absorbent for receiving the moisture from said hygroscopic substance, and a granulated material of greater specific gravity than said absorbent all intimately mixed in a state of free granules.

5. The herein-described composition of matter for laying or absorbing dust, containing chlorid of calcium, sawdust, and a granulated substance of greater specific gravity than sawdust all intimately commingled in a state of free granules.

6. The herein-described composition of matter for laying or absorbing dust, containing chlorid of calcium, sawdust and sand all intimately commingled in a state of free detached granules.

In testimony whereof I affix my signature in the presence of two witnesses.

BERTHOLD SINGER.

Witnesses:
L. WALDMAN,
C. HEYMANN.